(12) United States Patent
Alred et al.

(10) Patent No.: US 9,939,080 B2
(45) Date of Patent: Apr. 10, 2018

(54) MAGNETORHEOLOGICAL FLUID DEVICE

(71) Applicant: University of Houston, Houston, TX (US)

(72) Inventors: John M. Alred, Seabrook, TX (US); Amnah Kudia, Sugar Land, TX (US); Javier Villarreal, Houston, TX (US); Hilario Torres, Houston, TX (US); Gangbing Song, Pearland, TX (US); Devendra Patil, Houston, TX (US)

(73) Assignee: University of Houston, Houston, TX (US)

( * ) Notice: Subject to any disclaimer, the term of this patent is extended or adjusted under 35 U.S.C. 154(b) by 244 days.

(21) Appl. No.: 13/858,829

(22) Filed: Apr. 8, 2013

(65) Prior Publication Data

US 2014/0299801 A1    Oct. 9, 2014

(51) Int. Cl.
| | | |
|---|---|---|
| *F16K 31/06* | (2006.01) | |
| *F16K 31/122* | (2006.01) | |
| *E21B 33/035* | (2006.01) | |
| *E21B 41/00* | (2006.01) | |
| *F15B 21/06* | (2006.01) | |

(52) U.S. Cl.
CPC .......... *F16K 31/06* (2013.01); *E21B 33/0355* (2013.01); *E21B 41/00* (2013.01); *F15B 21/065* (2013.01); *F16K 31/122* (2013.01)

(58) Field of Classification Search
CPC .... F16K 31/122; F16K 31/1221; F16K 31/06; F16K 31/1225; F16K 31/124; F16F 9/537; F16F 9/53; F16F 9/532; F16F 9/535; F15B 21/065; E21B 41/00; E21B 33/0355
USPC ........... 3/14, 62; 137/909; 188/267.1, 267.2; 251/14, 62
See application file for complete search history.

(56) References Cited

U.S. PATENT DOCUMENTS

| | | | | |
|---|---|---|---|---|
| 4,147,325 | A * | 4/1979 | McGee | 251/25 |
| 4,199,131 | A * | 4/1980 | Boski | E21B 29/04 251/291 |
| 6,006,647 | A | 12/1999 | Van Winkle | |
| 6,463,736 | B1 | 10/2002 | Pohl et al. | |
| 6,871,618 | B2 * | 3/2005 | Masse | 123/90.12 |
| 7,428,922 | B2 | 9/2008 | Fripp et al. | |
| 2002/0114900 | A1 * | 8/2002 | Szalony | 427/598 |
| 2003/0019622 | A1 | 1/2003 | Goodson, Jr. et al. | |

(Continued)

FOREIGN PATENT DOCUMENTS

| | | | | |
|---|---|---|---|---|
| DE | 1163149 B | * | 2/1964 | F16K 31/06 |
| DE | 10124365 A1 | | 12/2002 | |

(Continued)

OTHER PUBLICATIONS

Machine translation for DE 102004046073 A1.*
Machine Translation for DE1163149B.*
Human Translation for DE 1163149 B.*
John, Shaju et al.; A Magnetorheological Actuation System: Test and Model; Smart Materials and Structures; Feb. 29, 2008; United Kingdom.
Nguyen, Q H et al.; An Analytical Method for Optimal Design of MR Valve Structures; Smart Materials and Structures; Aug. 10, 2009; United Kingdom.
Hitchcock, Gregory H. et al.; A New Bypass Magnetorheological Fluid Damper; Journal of Vibration and Acoustics; vol. 129; pp. 641-647; Oct. 2007; United States.
PCT International Search Report and Written Opinion; Application No. PCT/US2014/033368; dated Feb. 4, 2015; 11 pages.

(Continued)

*Primary Examiner* — Ian Paquette
(74) *Attorney, Agent, or Firm* — Fletcher Yoder, P.C.

(57) ABSTRACT

A system, including a flow control system, including a valve, a first cylinder including a piston coupled to the valve, wherein the piston moves axially within the first cylinder to transition the valve between open and closed positions, a magnetorheological (MR) fluid within the first cylinder configured to axially move the piston, and an MR fluid device configured to magnetize the MR fluid to control axial movement of the piston.

28 Claims, 5 Drawing Sheets

(56) References Cited

U.S. PATENT DOCUMENTS

| | | |
|---|---|---|
| 2006/0260891 A1* | 11/2006 | Kruckemeyer et al. ... 188/267.2 |
| 2009/0294231 A1* | 12/2009 | Carlson et al. ............ 188/267.2 |
| 2010/0038195 A1* | 2/2010 | Kojima ................. F16F 13/305 |
| | | 188/267.1 |
| 2011/0297394 A1 | 12/2011 | VanDelden |
| 2013/0068479 A1* | 3/2013 | AlDossary .............. E21B 23/14 |
| | | 166/381 |
| 2013/0264503 A1 | 10/2013 | Jahnke |
| 2013/0334449 A1* | 12/2013 | Muci ........................ F16K 7/17 |
| | | 251/324 |

FOREIGN PATENT DOCUMENTS

| | | | |
|---|---|---|---|
| DE | 102004046073 | * | 3/2006 |
| WO | 2008014039 A2 | | 1/2008 |
| WO | 2009030925 A2 | | 3/2009 |
| WO | 2009055199 A2 | | 4/2009 |
| WO | 2014/168966 A2 | | 10/2014 |

OTHER PUBLICATIONS

Eric H. Anderson, et al.; "Magnetorheological-Fluid Damper with Integral Step-And-Repeat Actuator"; World Scientific; Mountain View, CA (2006); 7 pages.

Shawn P. Kelso, et al.; "Precision Controlled Actuation and Vibration Isolation Utilizing Magnetorheological (MR) Fluid Technology"; American Institute of Aeronautics and Astronautics; Albuquerque, NM (2001); 8 pages.

Sean Kelso, et al.; "Experimental Validation of Novel Stictionless Magentorheological Fluid Isolator"; SPIE Conference on Smart Structures and Materials; San Diego, CA (2003); 13 pages.

* cited by examiner

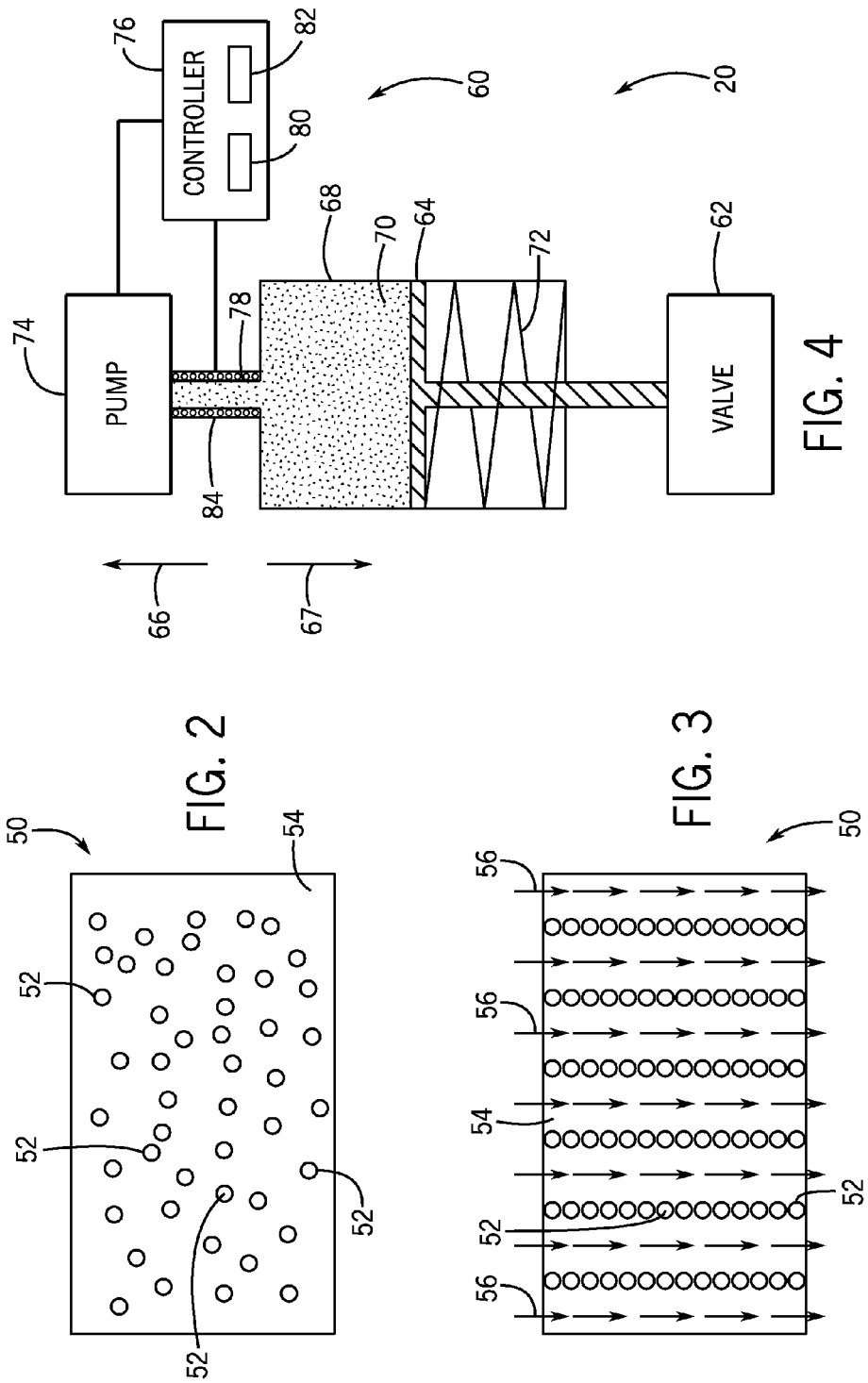

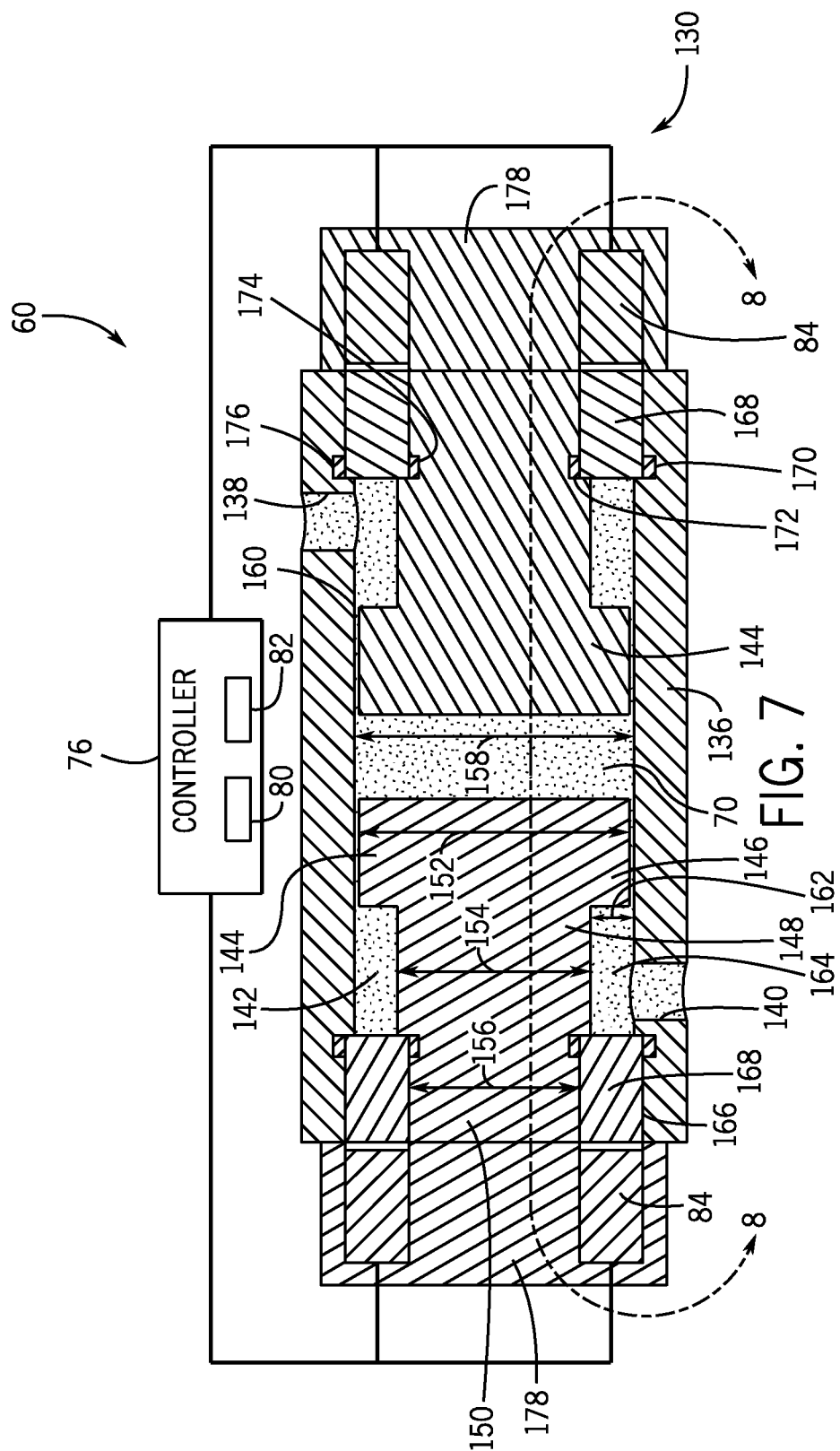

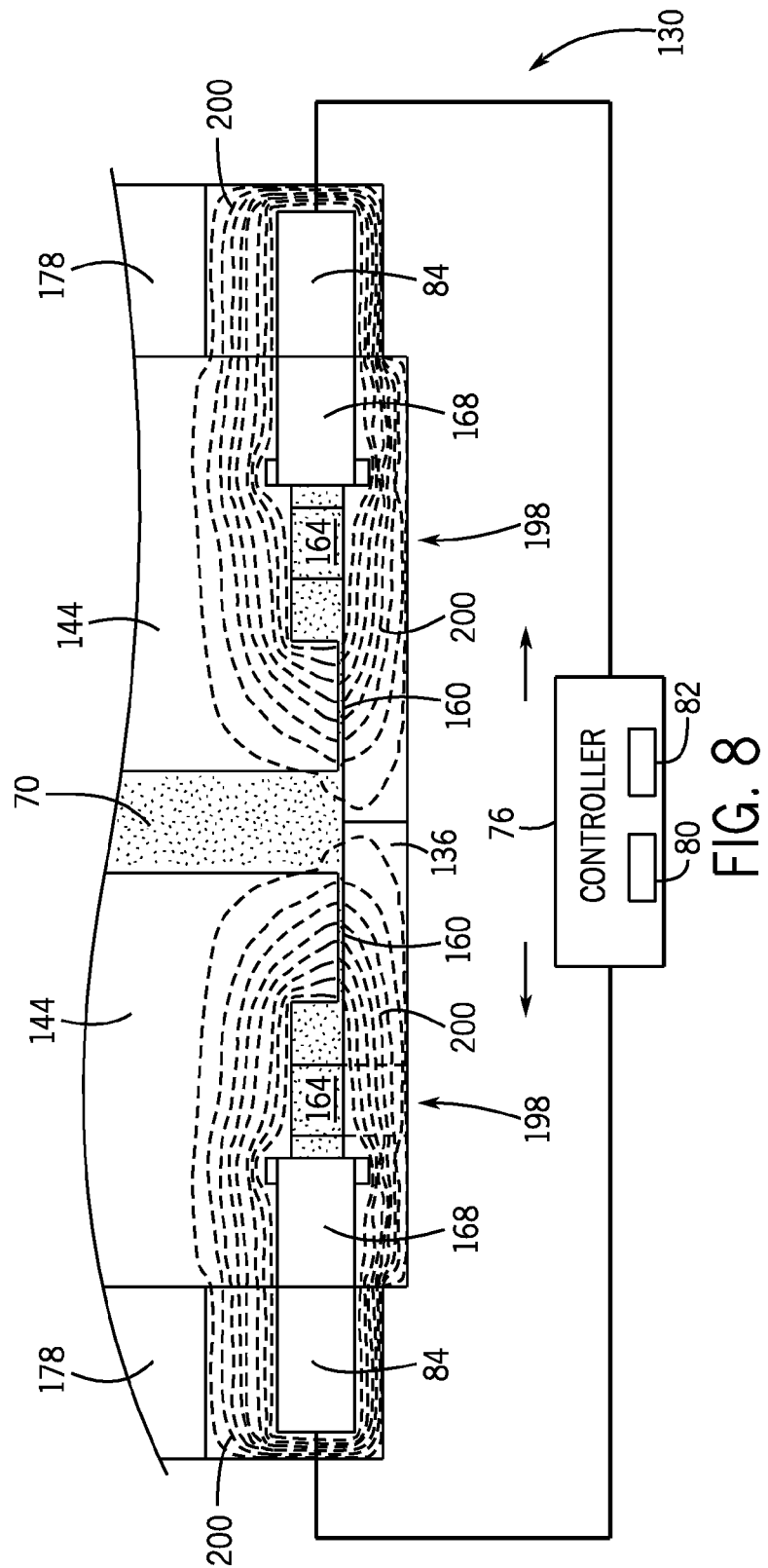

MAGNETORHEOLOGICAL FLUID DEVICE

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Natural resources, such as oil and gas, are used as fuel to power vehicles, heat homes, and generate electricity. When a desired resource is discovered below the surface of the earth, drilling and production systems are often employed to access and extract the resource. These systems may use devices (e.g., valves, chokes, etc.) to control fluid flow (e.g., oil or gas) in mineral extraction operations. These devices may operate using hydraulics, which open and close the devices using hydraulic pressure. However, maintaining the devices in an open or closed position may involve continuous application of hydraulic pressure.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 2 is a schematic of a magnetorheoligical fluid in an inactive state according to an embodiment;

FIG. 3 is a schematic of a magnetorheoligical fluid in an active state according to an embodiment;

FIG. 4 is a cross-sectional view of a flow control system according to an embodiment;

FIG. 7 is a cross-sectional view of an MR fluid device according to an embodiment; and FIG. 8 is a partial cross-sectional view of the MR fluid device according to an embodiment, along lines 8-8.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The disclosed embodiments include a flow control system that controls the position of a valve with fluid pressure. The flow control system may change the position of the valve (e.g., by opening, closing, partially opening, or partially closing the valve) to regulate the flow and pressures of fluids in various bores and channels throughout a mineral extraction system. The flow control system includes a magnetorheological (MR) fluid device capable of temporarily biasing, locking, or holding a valve in a specific position until it is desirable to change valve position. Accordingly, after the flow control system positions the valve, the flow control system may activate the MR fluid device to hold the valve in position. The ability of the MR fluid device to hold the valve in a specific position may allow the MR fluid device to completely replace or supplement other biasing or locking components (e.g., a pump) to maintain valve position, thereby increasing valve position reliability.

Figure 1:
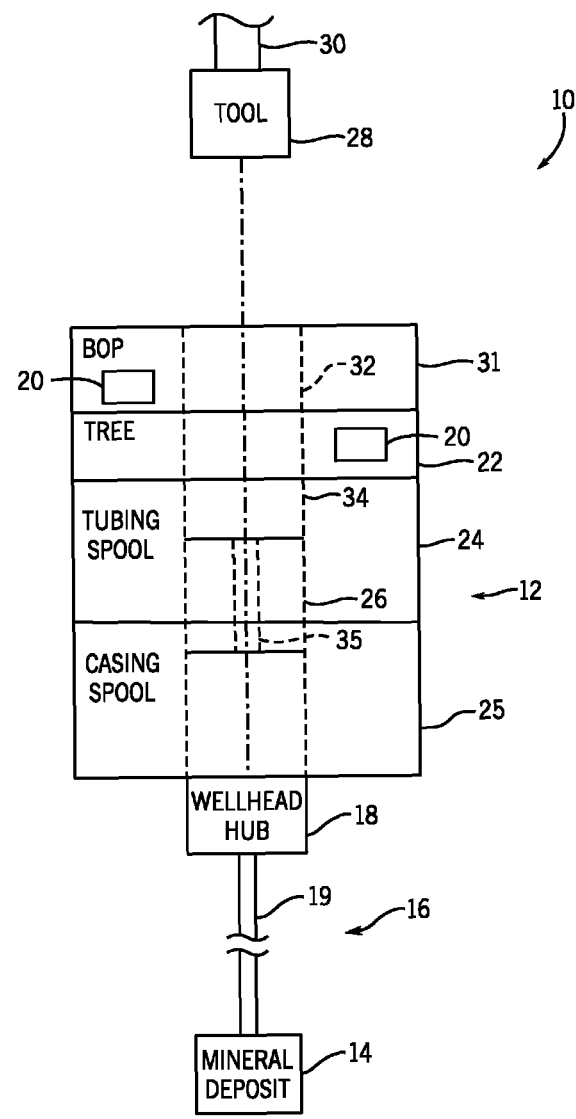
FIG. 1 is a block diagram illustrating a mineral extraction system according to an embodiment.

FIG. 1 is a block diagram that illustrates an embodiment of a mineral extraction system 10. The illustrated mineral extraction system 10 extracts various minerals and natural resources, including hydrocarbons (e.g., oil and/or natural gas), from the earth, or to inject substances into the earth. In some embodiments, the mineral extraction system 10 is land based (e.g., a surface system) or subsea (e.g., a subsea system). As illustrated, the system 10 includes a wellhead 12 coupled to a mineral deposit 14 via a well 16. The well 16 may include a wellhead hub 18 and a well bore 19. The wellhead hub 18 generally includes a large diameter hub disposed at the termination of the well bore 19 and designed to connect the wellhead 12 to the well 16. The wellhead 12 may include multiple components that control and regulate activities and conditions associated with the well 16. For example, the wellhead 12 generally includes flow control systems 20 that route produced minerals from the mineral deposit 14, regulate pressure in the well 16, and inject chemicals down-hole into the well bore 19. Some of these flow control systems 20 may include a magnetorheoligical (MR) fluid device that temporarily biases, locks, or holds the flow control system in a desired position (e.g., an open, closed, partially open, or partially closed position).

In the illustrated embodiment, the wellhead 12 includes what is colloquially referred to as a Christmas tree 22 (hereinafter, a tree), a tubing spool 24, a casing spool 25, and a hanger 26 (e.g., a tubing hanger and/or a casing hanger). The system 10 may include other devices that are coupled to the wellhead 12, and devices that are used to assemble and control various components of the wellhead 12. For example, in the illustrated embodiment, the system 10 includes a tool 28 suspended from a drill string 30. In certain embodiments, the tool 28 includes a running tool that is lowered (e.g., run) from an offshore vessel to the well 16 and/or the wellhead 12.

The tree 22 generally includes a variety of flow paths (e.g., bores), valves, fittings, and controls for operating the well 16. Typically the tree 22 may include a frame that is disposed about a tree body, a flow-loop, actuators, and valves. Further, the tree 22 may provide fluid communication with the well 16. For example, the tree 22 includes a tree bore 32. The tree bore 32 provides for completion and workover procedures, such as the insertion of tools into the well 16, the injection of various chemicals into the well 16, and so forth. Further, minerals extracted from the well 16 (e.g., oil and natural gas) may be regulated and routed via the tree 22 using the flow control system 20. Thus, enabling produced minerals to flow from the well 16 to the manifold via the wellhead 12 and/or the tree 22 before being routed to shipping or storage facilities. A blowout preventer (BOP) adapter 31 may also be included, either as a part of the tree 22 or as a separate device. The BOP adapter 31 may also have a flow control system 20 to prevent oil, gas, or other fluid from exiting the well in the event of an unintentional release of pressure or an overpressure condition.

The tubing spool 24 provides a base for the tree 22. Typically, the tubing spool 24 is one of many components in a modular subsea or surface mineral extraction system 10 that is run from an offshore vessel or surface system. The tubing spool 24 includes a tubing spool bore 34. The tubing spool bore 34 connects (e.g., enables fluid communication between) the tree bore 32 and the well 16. Thus, the tubing spool bore 34 may provide access to the well bore 19 for various procedures.

As will be appreciated, the well bore 19 may contain elevated pressures. For example, the well bore 19 may include pressures that exceed 10,000, 15,000, or even 20,000 pounds per square inch (psi). Accordingly, the mineral extraction system 10 may employ flow control systems 20 to control and regulate the well 16. For example, the flow control system 20 may include valves and a magnetorheological (MR) fluid device to regulate the flow and pressures of fluids in various bores and channels throughout the mineral extraction system 10.

FIG. 2 is a schematic of a magnetorheological (MR) fluid 50 in an inactive state (e.g., a non-magnetized state). The MR fluid 50 functions as a smart fluid capable of changing viscosity when exposed to a magnetic field. The MR fluid 50 includes multiple magnetizable particles 52 (e.g., iron particles) suspended in a carrier liquid 54 (e.g., oil based liquid). The particles 52 are relatively small, (e.g., each particle having a diameter on the order of several microns). For example, the average diameter of the particles 52 may be less than approximately 5, 10, 15, 20, 25, 50, or 100 microns. The particles 52 are also magnetizable (e.g., made of a magnetizable material such as iron), such that an external magnetic field can be selectively applied to the fluid 50 to magnetize the particles 52. The carrier liquid 54 is non-magnetizable and serves to suspend and protect the particles 52. As illustrated, in an unmagnetized state, the particles 52 are randomly dispersed throughout the carrier liquid 54. The particles 52 will remain in this state until exposed to a magnetic field.

FIG. 3 is a schematic of the MR fluid 50 in an active state (e.g., a magnetized state). When exposed to a magnetic field 56, the MR fluid 50 transitions from an inactive state to an active state. In the active state, the applied magnetic field 56 magnetizes the particles 52, which attracts the particles 52 to each other. As particles 52 attract to each other they align in the direction of the magnetic field 56. The attraction and alignment of the particles 52 increases the viscosity and yield shear stress of the MR fluid 50, enabling the MR fluid 50 to block and resist movement. More specifically, once magnetized in the field 56, the particles 52 resist separation from one another and misalignment with the magnetic field 56, or in other words they resist motion. The particles 52 continue in this state until removal or deactivation of the magnetic field 56.

The resistance of the MR fluid 50 to movement (i.e., viscosity and yield shear stress) relates to the strength of the magnetic field 56. For example, low strength magnetic fields may only moderately increase the viscosity and yield shear stress of the MR fluid 50, while high strength magnetic fields change the MR fluid 50 into a highly viscous fluid with a high yield shear stress. However, at a certain point, the strength of the magnetic field 56 will saturate the MR fluid 50 and any increase in the magnetic field will not increase the viscosity or yield shear stress of the MR fluid 50.

FIG. 4 is a cross-sectional view of a flow control system 20 with an MR fluid device 60. As explained above, the flow control system 20 opens and closes valves to regulate the flow and pressures of fluids in various bores and channels throughout the mineral extraction system 10. After opening, closing, partially opening, or partially closing a valve 62, the flow control system 20 may use the MR fluid device 60 to temporarily lock or block further movement the valve 62.

In FIG. 4, the flow control system 20 opens and closes valve 62 by moving the piston 64 in directions 66 and 67. As illustrated, a piston 64 rests within a cylinder 68 separating an MR fluid 70 (e.g., MR fluid 50) from a spring 72. The MR fluid 70 and the piston 64 force the piston 64 to alternate directions of movement to open and close the valve 62. Specifically, the MR fluid 70 moves the piston 64 in direction 67 and the spring 72 moves the piston in direction 66. In operation, a pump 74 may receive a signal from a controller 76 to begin pumping MR fluid 70 into the cylinder 68 through conduit 78. More specifically, the controller 76 may include a processor 80 that executes instructions stored on a memory 82 which enables the controller 76 to send signals and control components of the flow control system 20. The increase in MR fluid 70 into the cylinder 68 increases the pressure acting on the piston 64. With sufficient pressure, the MR fluid 70 will overcome the spring force of the spring 72 forcing the piston in direction 67. Depending on the arrangement of the valve 62, the movement of piston 64 in direction 67 may open or close the valve 62. Similarly, the controller 76 may reverse the pump 74 enabling the spring force of the spring 72 to overcome the pressure of the MR fluid 70 in the cylinder 68. As the spring 72 moves the piston 64 in direction 66, the piston 64 forces MR fluid 70 out of the cylinder 68 to open or close the valve 62. In some embodiments, the flow control device 20 may not include a spring 72; instead the pump 74 may pump MR fluid into the cylinder 68 on opposite sides of the piston 64. Accordingly, the pump 74 may move the piston 64 by alternating between increasing and decreasing the pressure of the MR fluid 70 on opposite sides of the piston 64.

As explained above, the fluid device 60 is capable of holding or locking the valve 62 in an open, closed, partially open, partially closed position with the MR fluid device 60. The MR fluid device 60 includes the controller 76 and an electromagnet 84 (e.g., a wire coil). In operation, the controller 76 may receive a signal indicating the need to open, close, partially open, or partially close the valve 62. As explained above, flow control system 20 may then use the pump 74 to manipulate the location of the piston 64, which moves the valve 62 into the proper position. When the valve 62 is in the proper position, the controller 76 may activate the electromagnet 84 to form an electromagnetic field through the conduit 78. The application of the magnetic field 56 aligns the particles 52, thereby increasing the viscosity and yield shear stress of the MR fluid 70. The increase in viscosity and yield shear stress blocks flow of the MR fluid 70 into and out of the pump 74, thereby resisting movement of the piston 64 and the valve 62. To reposition the valve 62, the controller 76 removes the magnetic field 56 by stopping the flow of electricity to the electromagnet 84. The removal of the magnetic field 56 enables the MR fluid 70 to transition from the active state to the inactive state (i.e., reducing the fluid viscosity and enabling the MR fluid 70 to flow). The controller 76 may decrease or increase the magnetic field 56 slowly or rapidly depending on the needs of flow control system 20. For example, a valve 62 may only need a small change in position. Accordingly, the controller 76 may gradually decrease the magnetic field 56, thereby decreasing the viscosity of the MR fluid 70 enabling the MR fluid 70 to gradually change the position of the valve 62. When the valve 62 reaches the proper position, the controller 76 may again increase the magnetic field 56 to resist further movement of the MR fluid 70. The ability to lock the valve 62 in position enables the controller 76 to turn off the pump 74, because fluid pressure is unnecessary to keep the valve 62 in position. Accordingly, the MR fluid device 60 increases position reliability of valve 62 and the longevity/durability of the pump 74.

Figure 5:
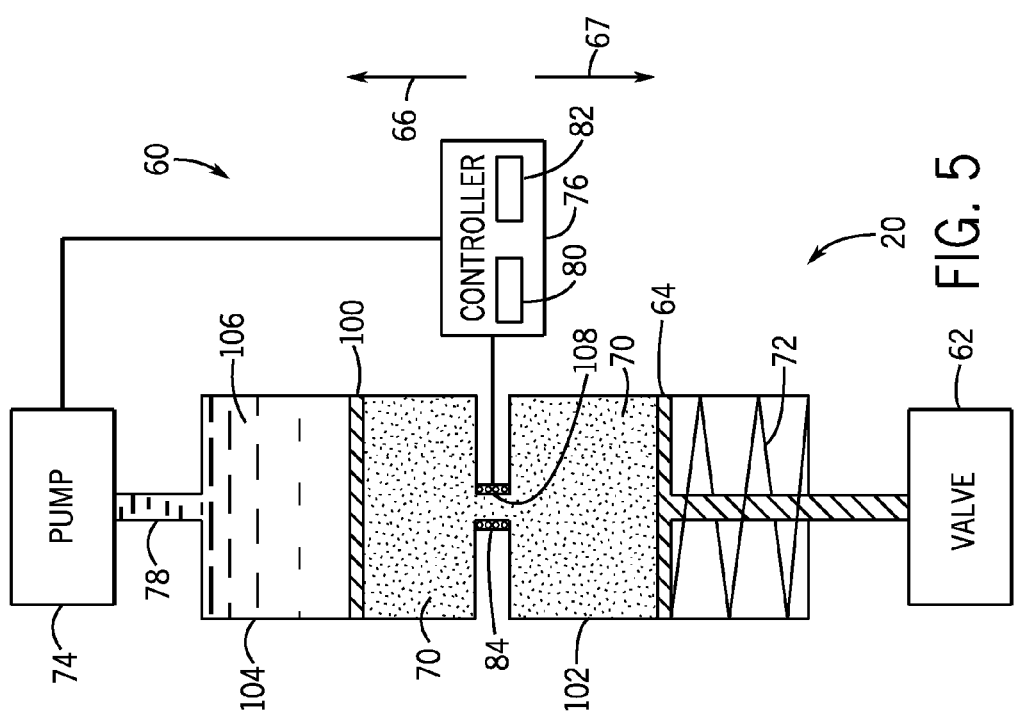
FIG. 5 is a cross-sectional view of a flow control system according to an embodiment.

FIG. 5 is a cross-sectional view of a flow control system 20 with an MR fluid device 60. As explained above, the flow control system 20 opens and closes valves to regulate the flow and pressures of fluids in various bores and channels throughout the mineral extraction system 10. After opening, closing, partially opening, or partially closing valve 62, the flow control system 20 may use the MR fluid device 60 to lock or hold the valve 62 in position. The flow control system 20 opens and closes valve 62 by transferring force between a first piston 64 and a second piston 100 in directions 66 and 67. As illustrated, the piston 64 rests within a first cylinder 102 separating an MR fluid 70 (e.g., MR fluid 50) from a spring 72. The second piston 100 rests within a second cylinder 104 separating a hydraulic fluid 106 from the MR fluid 70.

In operation, a pump 74 may receive a signal from a controller 76 to begin pumping hydraulic fluid 106 into the cylinder 104 through the conduit 78. The pressure of the hydraulic fluid 106 on the second piston 100 transfers through the MR fluid 70 to the first piston 64. With sufficient hydraulic pressure, transferred to and through the MR fluid 70, the piston 64 will overcome the spring force of the spring 72 and move in direction 67. Depending on the arrangement of valve 62, the movement of piston 64 in direction 67 may open or close the valve 62. Similarly, the controller 76 may reverse the pump 74 enabling the spring force of the spring 72 to overcome the pressure of the MR fluid 70 in the cylinders 102 and 104 and the hydraulic fluid in cylinder 104. As the spring 72 moves the first piston 64 in direction 66, the piston 64 forces MR fluid 70 out of the cylinder 102 and into cylinder 104. The increase in MR fluid 70 in the cylinder 104 then moves the piston 100, which forces hydraulic fluid 106 out of cylinder 104. As the piston 64 moves in direction 66, the valve 62 changes position (i.e., opens, closes, partially opens, or partially closes depending on the arrangement of valve 62).

As explained above, the fluid device 60 is capable of locking or holding the valve 62 in any position with the MR fluid device 60. In operation, the controller 76 may receive a signal indicating the desire to open, close, partially open, or partially close the valve 62. As explained above, flow control system 20 may then use the pump 74 to increase the pressure of the hydraulic fluid 106 to adjust the position of the piston 64, which moves the valve 62 into the proper position (i.e., opens, closes, partially opens, or partially closes the valve 62). When the valve 62 is in the proper position, the controller 76 may activate the electromagnet 84 to form an electromagnetic field 56 through the conduit 108. The application of the magnetic field 56 aligns the particles 52, thereby increasing the viscosity and yield shear stress of the MR fluid 70 in the conduit 108. The increase in viscosity blocks the flow of MR fluid 70 between the cylinder 102 and the cylinder 104, and thus helps to resist movement of the valve 62 to hold or lock the valve 62 in place. To reposition the valve 62, the controller 76 removes the magnetic field 56 by stopping the flow of electricity to the electromagnet 84. The removal of the magnetic field 56 enables the MR fluid 70 to transition from the active state to the inactive state, which reduces the fluid viscosity enabling the MR fluid 70 to flow between the cylinders 102 and 104. Locking the valve 62 in position enables the controller 76 to turn off the pump 74, because hydraulic fluid pressure may be unnecessary to maintain the valve 62 in position. Accordingly, the MR fluid device 60 increases position reliability of valve 62 and the longevity/durability of the pump 74. Moreover, by positioning MR fluid 70 between the cylinder 102 and the cylinder 104, the flow control system 20 reduces the amount of MR fluid 70 used in the flow control system 20. Specifically, the flow control system 20 is able to use hydraulic fluid to fill a substantial portion of the cylinder 104 instead of the more expensive MR fluid 70.

Figure 6:
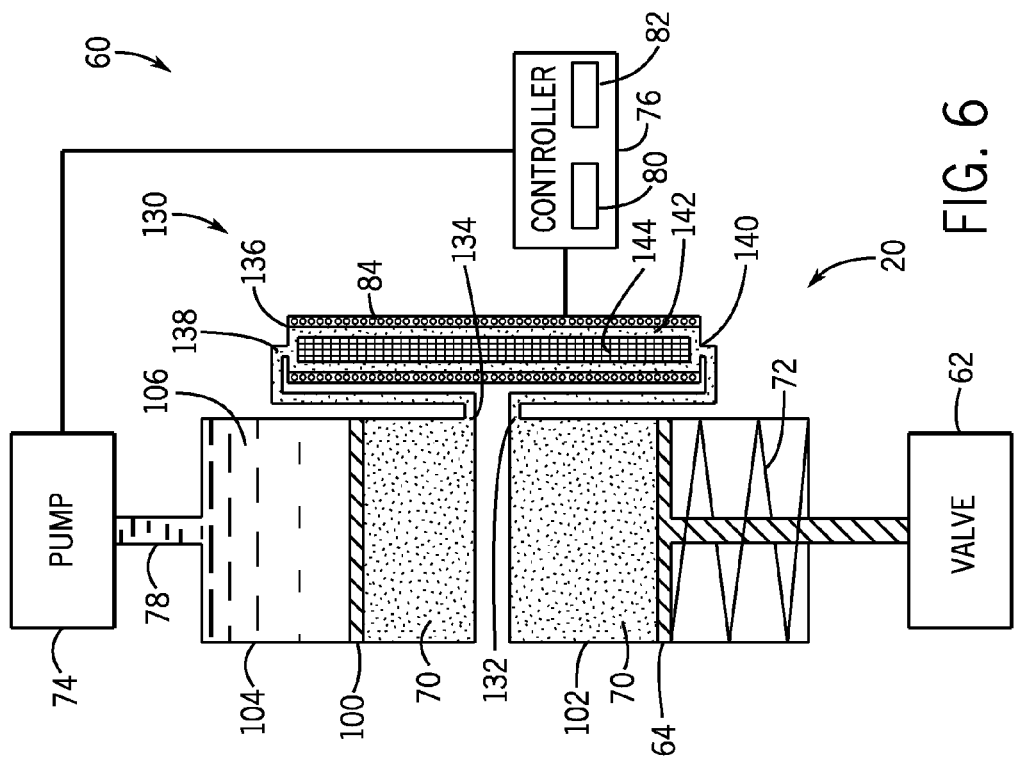
FIG. 6 is a cross-sectional view of a flow control system according to an embodiment.

FIG. 6 is a cross-sectional view of a flow control system 20 with an MR fluid device 60. As explained above, the flow control system 20 may open, close, partially open, or partially close a valve 62 and the lock the valve 62 in position with the MR fluid device 60. The flow control system 20 opens and closes valve 62 by moving a first piston 64 and a second piston 100 in directions 66 and 67. As illustrated, the piston 64 rests within a first cylinder 102 separating an MR fluid 70 (e.g., MR fluid 50) from a spring 72. The second piston 100 rests within a second cylinder 104 separating a hydraulic fluid 106 from the MR fluid 70. A bypass conduit 130 fluidly couples the first cylinder 102 to the second cylinder 104 by attaching to ports 132 and 134.

In operation, a pump 74 may receive a signal from a controller 76 to begin pumping hydraulic fluid 106 into the cylinder 104 through the conduit 78. As the hydraulic fluid 106 increases in pressure, the hydraulic fluid 106 moves the second piston 100, which forces MR fluid 70 out of the cylinder 104 through the bypass channel 130 and into the cylinder 102. With sufficient pressure, the hydraulic fluid 106, transferred through the MR fluid 70, will overcome the spring force of the spring 72 forcing the piston in direction 67. Depending on the arrangement of the valve 62, the movement of piston 64 in direction 67 may open or close the valve 62. Similarly, the controller 76 may reverse the pump 74, thereby enabling the spring force of the spring 72 to overcome the pressure of the MR fluid 70 and the hydraulic fluid in cylinder 104. As the spring 72 moves the first piston 64 in direction 66, the piston 64 forces MR fluid 70 out of the cylinder 102 through the bypass conduit 130 and into cylinder 104. The increase in MR fluid 70 in cylinder 104 moves the piston 100 in direction 66, which forces hydraulic fluid 106 out of cylinder 104. As the piston 64 moves in direction 66, the valve 62 changes position (i.e., opens, closes, partially opens, or partially closes depending on the arrangement of valve 62).

As explained above, the fluid device 60 is capable of holding or locking the valve 62 in any position with the MR fluid device 60 (i.e., open, closed, partially open, partially closed). In operation, the controller 76 may receive a signal indicating the desire to open, close, partially open, or partially close the valve 62. As explained above, flow control system 20 may then use the pump 74 to increase the pressure of the hydraulic fluid 106, thereby adjusting the position of the piston 64 (i.e., open, closed, partially open, or partially closed). When the valve 62 is in the proper position, the controller 76 may activate the MR fluid device 60 to block or resist movement of the valve 62.

The MR fluid device 60 includes the bypass conduit 130. The bypass conduit 130 includes a conduit housing 136 with ports 138 and 140 that enable fluid communication with MR fluid 70 within the cylinders 102 and 104. The bypass conduit 130 defines an interior cavity 142 with a core 144 and the electromagnet 84. The core 144 may be a magnetic core that guides and focuses the magnetic field; and increases the contact area with the MR fluid 70. The increase in contact area enables the electromagnet 84 to activate (i.e., magnetize) more of the MR fluid 70 within the bypass conduit 130, blocking MR fluid flow between the cylinders 102 and 104.

In operation, the electromagnet 84 receives electricity from the controller 76 to form an electromagnetic field within the bypass conduit 130. The magnetic field aligns magnetizable particles to increase the viscosity and yield shear stress of the MR fluid 70. The increase in viscosity and yield shear stress blocks the flow of MR fluid 70 through the bypass conduit 130, resisting pressure transfers between cylinder 102 and cylinder 104. The inability of the MR fluid 70 to flow between the cylinders 102 and 104 helps to hold or lock the valve 62 in place. To reposition the valve 62, the controller 76 stops electricity flow to the electromagnet 84, which reduces the viscosity and yield shear stress of the MR fluid 70 enabling the MR fluid 70 to flow and transfer pressure between the cylinder 102 and the cylinder 104. When the MR fluid device 60 is active, the controller 76 may turn the pump 74 off, because hydraulic fluid pressure may be unnecessary to maintain the valve 62 in position. Accordingly, the MR fluid device 60 increases position reliability of valve 62, and the longevity/durability of the pump 74. Moreover, by positioning MR fluid 70 between the cylinder 102 and the cylinder 104, the flow control system 20 reduces the amount of MR fluid 70 used in the flow control system 20. Specifically, the flow control system 20 is able to use hydraulic fluid to fill a substantial portion of the hydraulic cylinder 104 instead of the more expensive MR fluid 70. Finally, a flow control system 20 with a bypass conduit 130 provides increased surface area for the electromagnet 84, enabling stronger magnetic fields that block the flow of MR fluid 70.

FIG. 7 is a cross-sectional view an MR fluid device 60. The MR fluid device 60 includes the bypass conduit 130, the controller 76, and electromagnets 84. The bypass conduit 130 includes a conduit housing 136 made of a magnetizable material (e.g., iron), with an interior cavity 142 that enables MR fluid 70 (e.g., MR fluid 50) to flow between the ports 138 and 140. The conduit housing 136 may receive one or more cores 144. The cores 144 may be made from a magnetizable material (e.g., iron) that guides and focuses the magnetic field to improve activation of the MR fluid 70.

In the present embodiment, the conduit housing 136 receives two T-shaped cores 144, which assist in guiding and focusing the magnetic field produced by the electromagnets 84. The cores 144 include a first section 146, a second section 148, and a third section 150. Each section of the core 144 defines a different diameter. The first section 146 defines a diameter 152, which is greater than a diameter 154 of the second section 148, which is greater than the diameter 156 of the third section 150. As illustrated, the diameter 152 of the first section 146 is slightly smaller than a diameter 158 of the cavity 142 forming a gap 160. It is through the gap 160 that MR fluid 70 flows past the cores 144 in-between the ports 138 and 140. The narrow width of the gap 160 provides a suitable location to apply a magnetic field to block flow of the MR fluid 70 through the bypass conduit 130. Specifically, the proximity of the core's first section 146 to the conduit housing 136 assists in guiding and focusing the magnetic field across the gap 160 to facilitate activation of the MR fluid 70.

The second section 148 may also assist in focusing and guiding the magnetic field across the gap 160. As illustrated, the second section 148 is separated from the conduit housing 136 by a distance 162. The distance 162 forms an annular space 164 that is filled with MR fluid 70. As explained above, the MR fluid 70 (e.g., MR fluid 50) includes an unmagnetizable liquid 54 that suspends magnetizable particles 52. The unmagnetizable liquid 54 is less magnetically permeable than the cores 144 and the conduit housing 136. Accordingly, the annular space 164 discourages the magnetic field from crossing between the second section 148 and the conduit housing 136. Instead, the magnetic field is redirected to the first section 146 of the cores 144, where the magnetic field crosses through the MR fluid 70 in the gap 160 between the cores 144 and the conduit housing 136.

As explained above, the third section 150 defines a diameter 156. The difference between the diameter 156 and the cavity diameter 158 forms an annular space 166. The annular space 166 enables the conduit housing 136 to receive an annular cap 168 between the core 144 and the conduit housing 136. The annular cap 168 inserts into the cavity 142 and contacts an edge 170 of the conduit housing 136 and an edge 172 of the core's second section 148. In this position, the annular cap 168 blocks the flow of MR fluid 70 out of the conduit housing 136 by sealing with a first annular seal 174 around the core 144, and a second annular seal 176 along an interior of the conduit housing 136. The annular cap 168 is made from a nonmagnetic material (e.g., stainless steel) and functions like the space 164. Specifically, the annular cap blocks the magnetic field from crossing between the core 144 and the conduit housing 136 in the space 166. Instead, the magnetic field is redirected to the first section 146 of the cores 144 where the magnetic field crosses through the MR fluid 70 in the gap 160 between the cores 144 and the conduit housing 136.

Electromagnet housings 178 couple to the conduit housing 136 and contains the electromagnets 84 (i.e., electromagnet coils). The electromagnets 84 electrically couple to the controller 76, which turns the electromagnets 84 on and off by selectively passing current through the electromagnets 84. As explained above, when the controller 76 turns on the electromagnets 84, the magnetic field induces the MR fluid 70 to change viscosity and yield shear stress. The change in viscosity blocks the flow of MR fluid 70 through the bypass conduit 130.

FIG. 8 is a partial cross-sectional view of the MR fluid device 60 along line 8-8 of FIG. 7. In FIG. 8, electromagnets 84 are active. When the controller 76 turns on the electromagnets 84, the electromagnets 84 produce a magnetic field 198 that travels through the cores 144 and the conduit housing 136, illustrated by the magnetic flux lines 200. As the magnetic field 198 crosses the gap 160, the magnetic field 198 attracts and aligns the magnetizable particles in the MR fluid 70, which blocks fluid flow by increasing the viscosity and yield shear stress of the MR fluid 70 within the gap 160. Furthermore, because the magnetic field is approximately perpendicular to the gap 160, the MR fluid 70 aligns approximately perpendicular to the gap 160. The perpendicular alignment of the MR fluid 70 in the gap 160 improves fluid flow blocking, as the MR fluid 70 in the gap 160 resists misalignment in the direction of fluid flow through the conduit housing 136.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
   a flow control system, comprising:
      a valve configured to move between an open position enabling fluid flow and a closed position blocking fluid flow along a fluid flow path;
      a first cylinder portion comprising a first piston coupled to the valve;
      a second cylinder portion comprising a second piston;
      a first chamber having a magnetorheological (MR) fluid disposed between the first and second pistons;
      a second chamber having a liquid in fluid contact with the second piston;
      an actuator configured to supply the liquid to the second chamber to drive movement of the second piston, the MR fluid, the first piston, and the valve to a valve position at or between the open and closed positions; and
      an MR fluid device configured to magnetize the MR fluid in the first chamber to resist movement of the first piston and the valve away from the valve position at or between the open and closed positions.

2. The system of claim 1, wherein the actuator is configured to control a first pressure of the MR fluid by controlling a second pressure of the liquid separate from the MR fluid.

3. The system of claim 1, wherein the flow control system is configured to stop supplying the liquid to the second chamber against the second piston via the actuator while magnetizing the MR fluid via the MR fluid device to hold the valve position of the valve.

4. The system of claim 1, wherein the MR fluid device comprises an electromagnet axially spaced at an offset distance relative to an annular gap disposed axially between opposite first and second annular spaces along an axis, and the first and second annular spaces have a radial width larger than the annular gap.

5. The system of claim 1, wherein the actuator is configured to magnetize the MR fluid sufficient to hold the valve in the valve position without a pressure of the liquid supplied by the actuator against the second piston.

6. The system of claim 5, wherein the actuator comprises a pump configured to pump the liquid to the second chamber, and the flow control system is configured to disable the pump while the actuator magnetizes the MR fluid sufficient to hold the valve in the valve position.

7. The system of claim 1, wherein the MR fluid device comprises first and second electromagnets disposed on axially opposite sides of first and second gaps along a flow path, the first electromagnet is configured to direct a first magnetic field across the first gap, and the second electromagnet is configured to direct a second magnetic field across the second gap.

8. The system of claim 7, wherein the flow path comprises spaces on axially opposite sides of the first and second gaps, and the spaces are wider than the first and second gaps.

9. The system of claim 1, wherein the MR fluid device comprises an electromagnet configured to create a magnetic field that magnetizes the MR fluid to resist movement of the first piston and the valve away from the valve position.

10. The system of claim 9, wherein the flow control system comprises a spring configured to counteract the MR fluid, the actuator, or both, wherein the spring is disposed between the first piston and the valve.

11. The system of claim 9, wherein the controller is configured to control the electromagnet to gradually decrease the magnetic field to lessen resistance and gradually enable movement of the first piston and the valve.

12. The system of claim 9, wherein the MR fluid device comprises a controller configured to control the electromagnet to cause the magnetic field to increase the viscosity of the MR fluid sufficient to lock the valve position of the valve.

13. The system of claim 12, wherein the MR fluid device comprises an electromagnet disposed at an axial offset from a gap in a conduit having the first chamber between the first cylinder portion and the second cylinder portion, the gap is disposed between axially opposite first and second spaces in the conduit, the first and second spaces are wider than the gap, and the axial offset of the electromagnet is configured to direct the magnetic field substantially perpendicular through the gap.

14. The system of claim 13, wherein the gap has a gap width less than a wall width of a wall of the conduit.

15. The system of claim 13, wherein the gap is disposed circumferentially about a core fixed in the conduit, and a wall of the conduit extends circumferentially about the gap.

16. A system, comprising:
   a flow control device, comprising:
      a magnetorheological (MR) fluid device, comprising:
         a conduit having a core disposed in a fixed position, wherein a gap is disposed circumferentially about the core in the conduit, a wall of the conduit extends circumferentially about the gap, and the conduit is configured to fluidly couple a first cylinder portion containing MR fluid to a second cylinder portion containing MR fluid; and
         an electromagnet coupled to the conduit, wherein the electromagnet is axially offset away from the gap along an axis of the conduit, and the electromagnet is configured to direct a magnetic field through the gap to resist MR fluid movement within the conduit and resist movement of a valve.

17. The system of claim 16, wherein the conduit comprises first and second spaces on axially opposite first and second sides of the gap, and the first and second spaces have a greater radial width than the gap.

18. The system of claim 16, wherein the electromagnet comprises first and second electromagnets disposed on axially opposite sides of first and second gaps along a flow path through the conduit, the first electromagnet is configured to direct a first magnetic field across the first gap, and the second electromagnet is configured to direct a second magnetic field across the second gap.

19. The system of claim 16, wherein the magnetic field is approximately perpendicular to the gap.

20. The system of claim 16, wherein the gap comprises an annular gap between the core and the wall of the conduit.

21. The system of claim 16, wherein the MR fluid device comprises a controller configured to control the electromagnet to cause the magnetic field to increase a viscosity of the MR fluid sufficient to lock a valve position of the valve.

22. A system, comprising:
   a flow control system, comprising:
      a valve configured to move to a valve position at or between an open position enabling fluid flow and a closed position blocking fluid flow along a fluid flow path;

a first cylinder portion comprising a first piston coupled to the valve, wherein the first piston moves axially within the first cylinder to transition the valve between the open and closed positions; and a magnetorheological (MR) fluid device comprising a first chamber having a magnetorheological (MR) fluid disposed in contact with the first piston, wherein the MR fluid device comprises an electromagnet configured to generate a magnetic field to change a viscosity of the MR fluid, the electromagnet comprises a first electromagnet axially spaced at an offset distance relative to a first annular gap disposed axially between opposite first and second annular spaces along an axis, the first and second annular spaces have a radial width larger than the annular gap, and the flow control system is configured to control the electromagnet to increase the viscosity of the MR fluid sufficient to hold the first piston and the valve position of the valve.

23. The system of claim 22, wherein the flow control system comprises:
a second cylinder portion comprising a second piston, wherein the second cylinder is fluidly coupled to the first cylinder via a conduit having the first chamber; and
a second chamber having a liquid in fluid contact with the second piston; and
an actuator configured to supply the liquid to the second chamber to drive movement of the second piston, the MR fluid, the first piston, and the valve to the valve position.

24. The system of claim 22, wherein the conduit comprises a core disposed in a fixed position along the conduit, the annular gap is disposed circumferentially about the core in the conduit, and a wall of the conduit extends circumferentially about the annular gap.

25. The system of claim 22, wherein the MR fluid device comprises a controller coupled to the electromagnet, the controller is configured to control the electromagnet to vary the magnetic field to vary the viscosity of the MR fluid and a resistance to a movement of the first piston and the valve, the controller is configured to control the electromagnet to gradually decrease the magnetic field to lessen the viscosity of the MR fluid and the resistance and enable gradual movement of the first piston and the valve.

26. The system of claim 22, wherein the electromagnet comprises a second electromagnet, the first and second electromagnets are disposed on axially opposite sides of the first annular gap and a second annular gap along a flow path through the first chamber, the first electromagnet is configured to direct a first magnetic field across the first annular gap, and the second electromagnet is configured to direct a second magnetic field across the second annular gap.

27. The system of claim 22, wherein the flow control system is configured to supply pressure to drive movement of the first piston and the valve, and the flow control system is configured to stop supplying pressure when the valve is disposed at a desired position while magnetizing the MR fluid via the electromagnet to hold the first piston and the valve in the desired position.

28. A system, comprising:
a flow control system, comprising:
a valve configured to move between an open position enabling fluid flow and a closed position blocking fluid flow along a fluid flow path;
a first cylinder comprising a first piston coupled to the valve;
a magnetorheological (MR) fluid disposed within the first cylinder;
an actuator configured to drive movement of the valve to a valve position at or between the open and closed positions; and
an MR fluid device configured to magnetize the MR fluid to resist movement of the first piston and the valve away from the valve position at or between the open and closed positions, wherein the MR fluid device comprises first and second electromagnets disposed on axially opposite sides of first and second gaps along a flow path, the first electromagnet is configured to direct a first magnetic field across the first gap, and the second electromagnet is configured to direct a second magnetic field across the second gap.

* * * * *